US008345657B2

(12) United States Patent
Yang et al.

(10) Patent No.: US 8,345,657 B2
(45) Date of Patent: Jan. 1, 2013

(54) METHOD AND DEVICE OF TRANSMITTING AND PARSING DATA IN WIRELESS COMMUNICATION NETWORK

(75) Inventors: Tao Yang, Shanghai (CN); Mingli You, Shanghai (CN); Jin Liu, Shanghai (CN); Pingping Wen, Shanghai (CN)

(73) Assignee: Alcatel Lucent, Paris (FR)

( * ) Notice: Subject to any disclaimer, the term of this patent is extended or adjusted under 35 U.S.C. 154(b) by 789 days.

(21) Appl. No.: 12/438,210

(22) PCT Filed: Aug. 22, 2007

(86) PCT No.: PCT/CN2007/002542
§ 371 (c)(1),
(2), (4) Date: Jul. 16, 2009

(87) PCT Pub. No.: WO2008/025250
PCT Pub. Date: Mar. 6, 2008

(65) Prior Publication Data
US 2010/0008350 A1 Jan. 14, 2010

(30) Foreign Application Priority Data

Aug. 23, 2006 (CN) .......................... 2006 1 0030361

(51) Int. Cl.
*H04J 3/24* (2006.01)
*H04L 12/28* (2006.01)
(52) U.S. Cl. ........................................ 370/349; 370/389
(58) Field of Classification Search .................. None
See application file for complete search history.

(56) References Cited

U.S. PATENT DOCUMENTS

| | | | |
|---|---|---|---|
| 7,571,242 B2 | 8/2009 | Wilson | |
| 2005/0053066 A1* | 3/2005 | Famolari | 370/389 |
| 2005/0114489 A1 | 5/2005 | Yonge et al. | |
| 2006/0153232 A1* | 7/2006 | Shvodian | 370/468 |
| 2007/0297375 A1* | 12/2007 | Bonta et al. | 370/338 |

FOREIGN PATENT DOCUMENTS

| | | |
|---|---|---|
| CN | 1400756 A | 3/2003 |
| CN | 1134918 C | 1/2004 |

(Continued)

OTHER PUBLICATIONS

International Search Report.

(Continued)

*Primary Examiner* — John Blanton
(74) *Attorney, Agent, or Firm* — Fay Sharpe LLP

(57) ABSTRACT

The present invention provides a method and corresponding device of processing and parsing a to-be-transmitted data packet in a communication network, such as a LTE system. A sub-header that is used for a header portion of a transmitted data packet is generated for each component data packet constituting the transmitted data packet, containing: original data packet ID for indicating an original data packet which the component data packet belongs to; segmentation processing ID for indicating times of segmentation happened to the original data packet in order to the component data packet, and a data segment which said component data packet belongs to after each segmentation; data amount IF for indicating a data amount of a data portion of the data packet. With the technical solution provided by the present invention, the header structure definition of a data packet is optimized, and the transmission resource utilization efficiency is improved.

29 Claims, 9 Drawing Sheets

FOREIGN PATENT DOCUMENTS

| | | |
|---|---|---|
| CN | 1610338 A | 4/2005 |
| CN | 1819555 A | 8/2006 |
| EP | 1 211 868 | 6/2002 |
| JP | 2005086438 A | 8/2000 |
| JP | 2000216791 A | 3/2005 |
| WO | WO2004/114609 A1 | 12/2004 |

OTHER PUBLICATIONS

European Search Report dated Nov. 9, 2011.
Chappell, Laura A., et al., Guide to TCP/IP, Second Edition, Thomson Course Technology.

* cited by examiner

METHOD AND DEVICE OF TRANSMITTING AND PARSING DATA IN WIRELESS COMMUNICATION NETWORK

FIELD OF THE INVENTION

The present invention relates to a communication network, and more particularly, to a method and a device of transmitting and parsing data in a wireless communication network.

BACKGROUND OF THE INVENTION

It is necessary to first explain several concepts before starting to describe the background and the technical solution of the present invention:

to-be-transmitted data packets: data packets waiting to be sent in a sending device, comprising original data packets and data segments, wherein said to-be-transmitted data packets come from retransmission queue besides conventional transmission queue, and to-be-transmitted data packets in retransmission queue usually has a higher priority level;

transmission time interval (TTI): one kind of wireless transmission resource, and only after transmission time interval is allocated, will data packets in to-be-transmitted data packets be transmitted;

original data packets: data packets that have not been segmented, such as ARQ SDU;

component data packets: original data packets or data segments for constituting a to-be-transmitted data packet;

transmitted data packets: data packets being transmitted in one TTI;

data segments: a kind of data packets obtained from segmenting an original data packet or a data segment.

It has been decided that automatic retransmission request (ARQ) is the most important function of RLC sub-layer in a system based on long-term evolution (LTE). One of the agreements about the ARQ is that segmentation or concatenation should be applied for the to-be-transmitted data packet according to the TB (Transmission Block) size, so as to make full use of the limited TTI.

It can be understood that, how to make the header portion of a transmitted data packet occupy number of bits as little as possible under the precondition of ensuring the receiver can receive and parse the transmitted data packet correctly is of critical importance to the limited TTI and the limited TB.

Although there are many structure definition schemes of transmitted data packet in the prior art, all of them contain relatively serious deficiencies. For example:

too many fields are needed to indicate one component data packet in the header of a transmitted data packet;

some of existing schemes do not work if segmentation happens to a data segment other than an original data packet;

some of existing schemes use one unnecessary "F" field to indicate each data segment;

the use of TSN or SSN causes large header overheads.

Apparently, the header defined by the many definition schemes of transmitted data packet header in the prior art is far from optimal, and effective utilization of transmission time interval cannot be achieved.

SUMMARY OF THE INVENTION

To overcome the above problems in the prior art, the present invention provides optimized definitions of a header structure of a transmitted data packet in a sending device of a communication network, which reduces header overheads and makes fuller use of limited TTI.

According to a first aspect of the present invention, provided is a method of processing a to-be-transmitted data packets based on transmission time interval in a sending device of a communication network, comprising the steps of: a. according to said transmission time interval, determining a transmission queue of component data packets corresponding to the transmission time based on to-be-transmitted data packets; b. generating a sub-header for each component data packet in the transmission queue in accordance with needs, which comprises the following information of the component data packet: original data packet ID for indicating the original data packet which the component data packet belongs to; segmentation processing ID for indicating times of segmentation happened to the original data packet in order to generating the component data packet, and the data segment which said component data packet belongs to after each segmentation; data amount ID for indicating the data amount of the data portion of the component data packet; c. generating a transmitted data packet based on each of said generated sub-headers and data portions of the respective component data packets in said transmission queue, whose header portion contains component number indicating information for indicating the number of component data packets contained in said transmitted data packet.

According to a second aspect of the present invention, provided is a processing device for processing to-be-transmitted data packets based on transmission time interval in a sending device of a communication network, comprising: determining means for, according to said transmission time interval, determining a transmission queue of component data packets corresponding to the transmission time based on the to-be-transmitted data packets; first generating means for generating a sub-header for each component data packet in the transmission queue in accordance with needs, which comprises the following information of the component data packet: original data packet ID for indicating the original data packet which the component data packet belongs to; segmentation processing ID for indicating times of segmentation happened to the original data packet in order to generating the component data packet, and the data segment which said component data packet belongs to after each segmentation; data amount ID for indicating the data amount of the data portion of the component data packet; second generating means for generating a transmitted data packet based on each of said generated sub-headers and data portions of the respective component data packets in said transmission queue, whose header portion contains component number indicating information for indicating the number of component data packets contained in said transmitted data packet.

According to a third aspect of the present invention, provided is a method of parsing a transmitted data packet based on transmission time interval in a receiving device of a communication network, comprising the steps of: 1) extracting component number indicating information from the header portion of said transmitted data packet; 2) extracting a first-order sub-header from the header portion of said transmitted data packet; 3) according to segmentation processing information contained in the first-order sub-header, judging whether or not times of segmentation happened to the original data packet in order to obtain the component data packet corresponding to the first-order sub-header is zero; 4) if times of segmentation happened to the original data packet in order to obtain the component data packet corresponding to the first-order sub-header is not zero, extracting the corresponding data portion from the data portion of the transmitted data packet and storing it to a buffer; 5) using the next sub-header to the first-order sub-header in the header portion of the transmitted data packet as a new first-order sub-header, and repeating steps 2) and 3).

According to a fourth aspect of the present invention, provided is a parsing device for parsing a received transmitted data packet based on transmission time interval in a receiving device of a communication network, comprising: extracting means for extracting component number indicating information from the header portion of said transmitted data packet, wherein said extracting means is further used for extracting a first-order sub-header from the header portion of said transmitted data packet; judging means for, according to segmentation processing information contained in the first-order sub-header, judging whether or not times of segmentation happened to the original data packet in order to obtain the component data packet corresponding to the first-order sub-header is zero, wherein said judging means is further used for extracting a corresponding data portion from the data portion of the transmitted data packet and storing it to a buffer if times of segmentation happened to the original data packet in order to obtain the component data packet corresponding to the first-order sub-header is not zero; the parsing device further comprising controlling means for using the next sub-header to the first-order sub-header in the header portion of the transmitted data packet as a new first-order sub-header to control said extracting means and said judging means to perform corresponding operations on the new first-order sub-header.

BRIEF DESCRIPTION ON THE DRAWINGS

Figure 8:
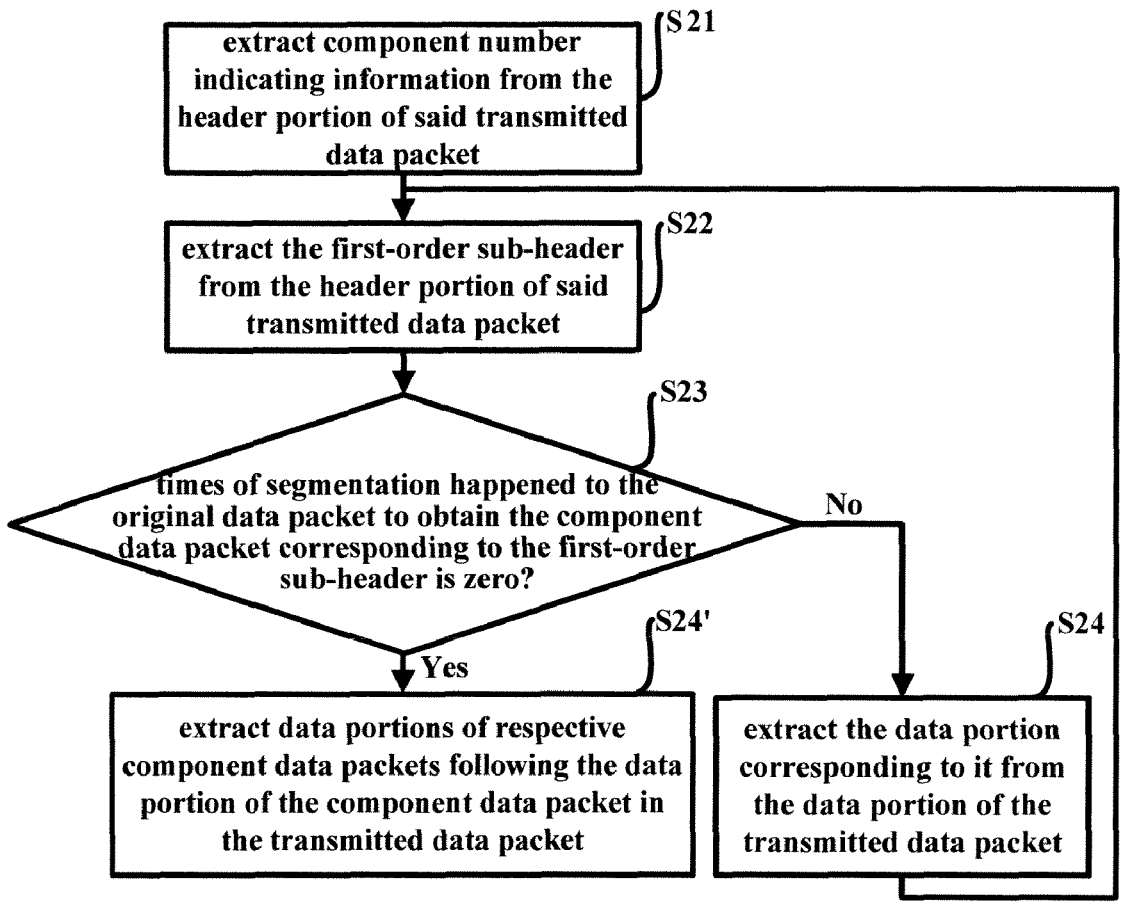
Figure 9:
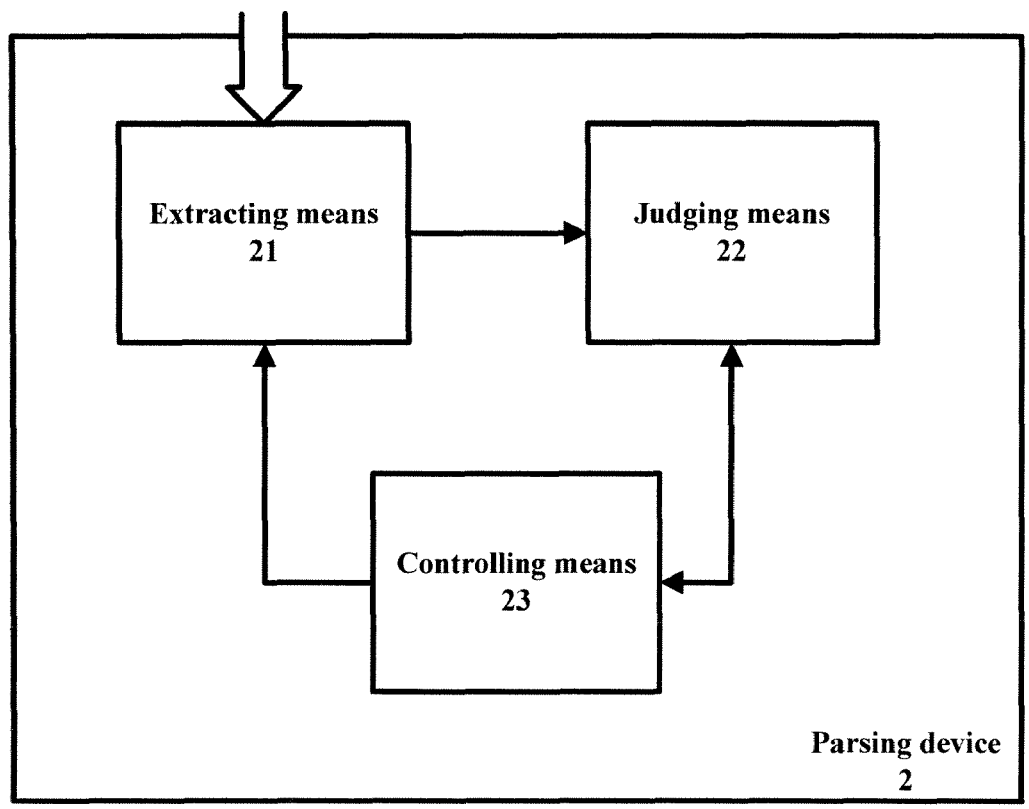

FIG. 8 is a flowchart of a method of parsing a transmitted data packet based on transmission time interval in a receiving device of the communication network according to an embodiment of the present invention; and FIG. 9 is a block diagram of a parsing device for parsing a transmitted data packet based on transmission time interval in the receiving device of the communication network according to an embodiment of the present invention.

DESCRIPTION OF THE PREFERRED EMBODIMENTS

Hereinafter, the present invention will be described in detail with reference to the accompanying drawings.

Figure 1:
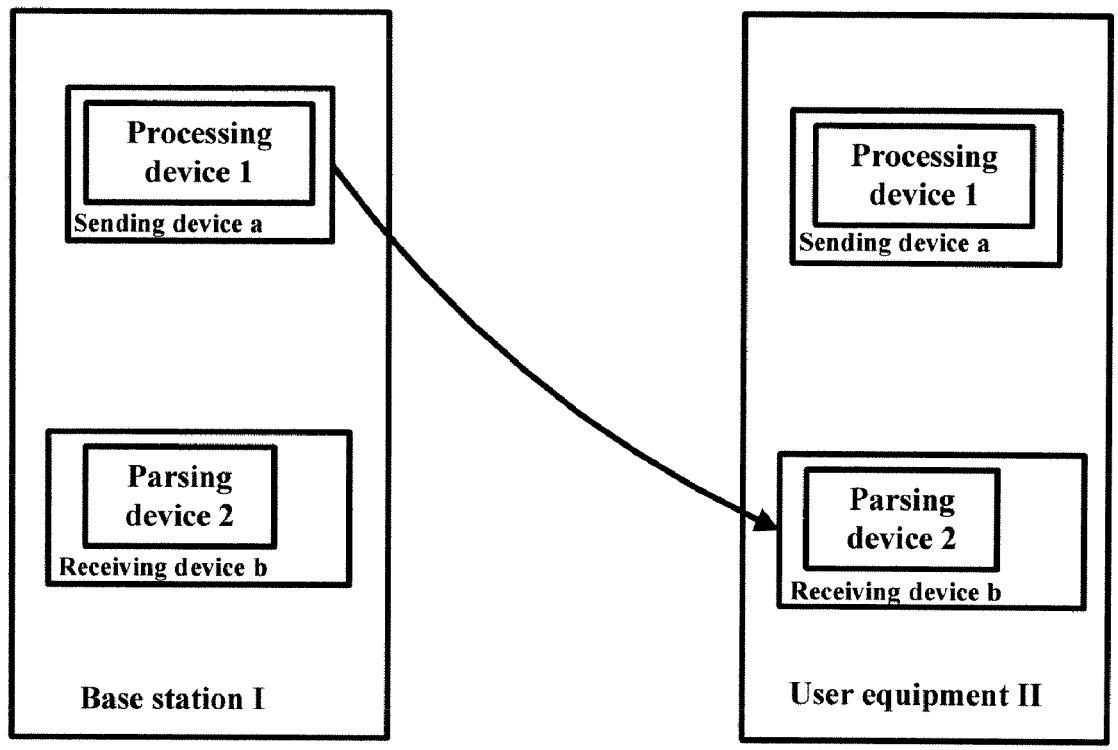
FIG. 1 is a layout view of a communication network according to an embodiment of the present invention.

FIG. 1 is a layout view of a communication network according to an embodiment of the present invention, in which merely a base station I and user equipment II are shown for the purpose of conciseness. Due to the bi-directionality of communication, base station I and user equipment II each comprise a sending device a and a receiving device b according to the present invention, and sending device a comprises a processing device 1 according to the present invention, and receiving device b comprises a parsing device 2 according to the present invention.

Figure 2:
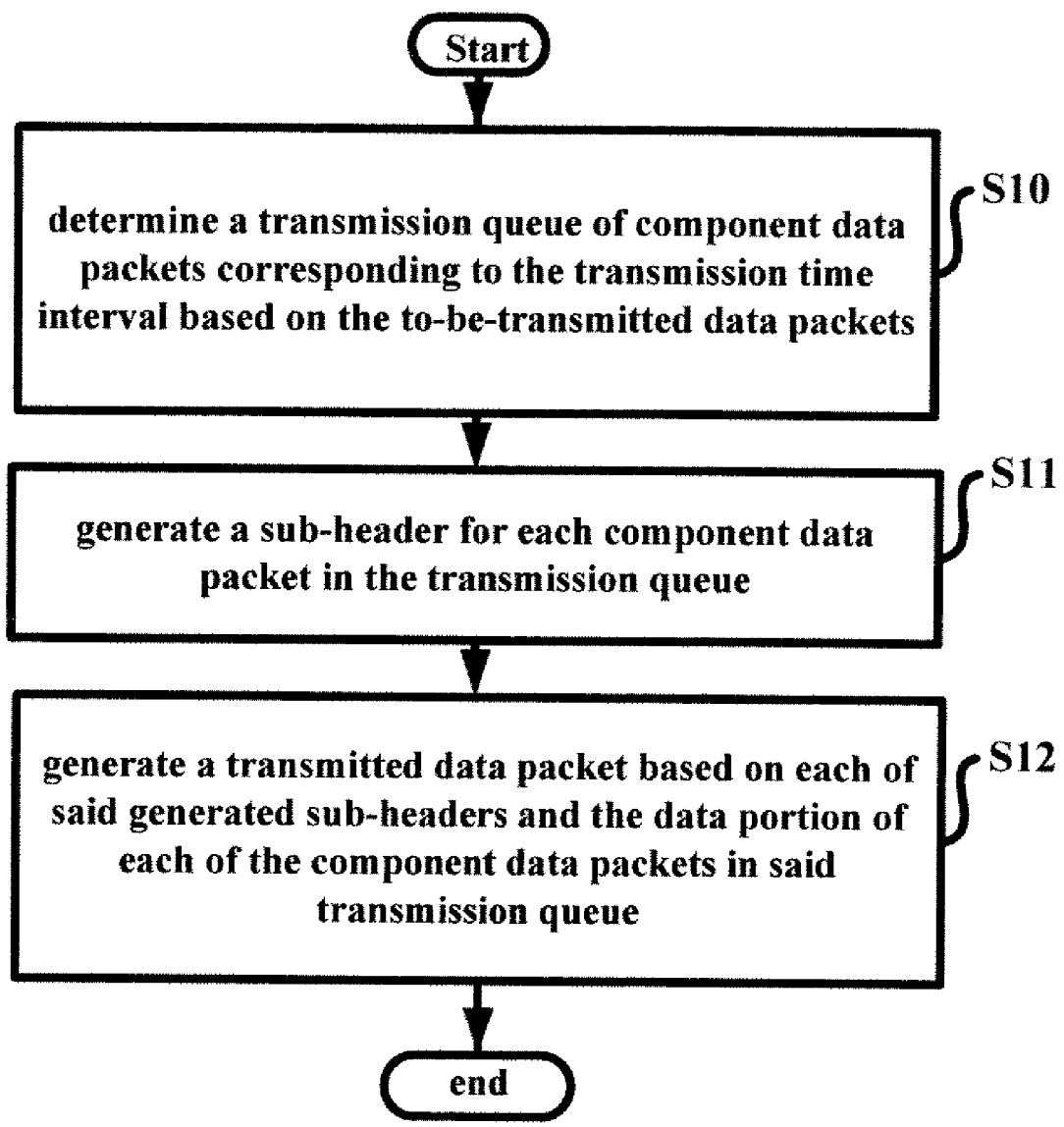
FIG. 2 is a flowchart of a method of processing a to-be-transmitted data packet based on transmission time in a sending device of the communication network according to an embodiment of the present invention.

FIG. 2 is a flowchart of a method of processing a to-be-transmitted data packet based on transmission time interval in the sending device of the communication network according to an embodiment of the present invention. Hereinafter, the method will be described with reference to FIG. 2 and in conjunction with FIG. 1. Take downlink transmission as an example. The method starts with step S10.

In step S10, said processing device 1 determines a transmission queue of component data packet(s) corresponding to the transmission time interval, i.e. the transmission queue of component data packet(s) to be transmitted in said TTI. According to the TTI, processing device 1 in sending device a of base station I determines from to-be-transmitted data packets (the following description will not distinguish between retransmission queue and conventional transmission queue for the purpose of conciseness) component data packet(s) that can be transmitted in said TTI. According to the relationship between the transmittable data amount corresponding to the TTI and the size of original data packet or the size of data segment, the determined queue of component data packet(s) to be transmitted in the TTI may comprise the following circumstances:

the queue comprises only one component data packet that is a data segment or an original data packet;

the first component data packet in the queue is a data segment or an original data packet, which is followed by zero to multiple original data packets, and the end of the queue is zero or one data segment.

Figure 3:
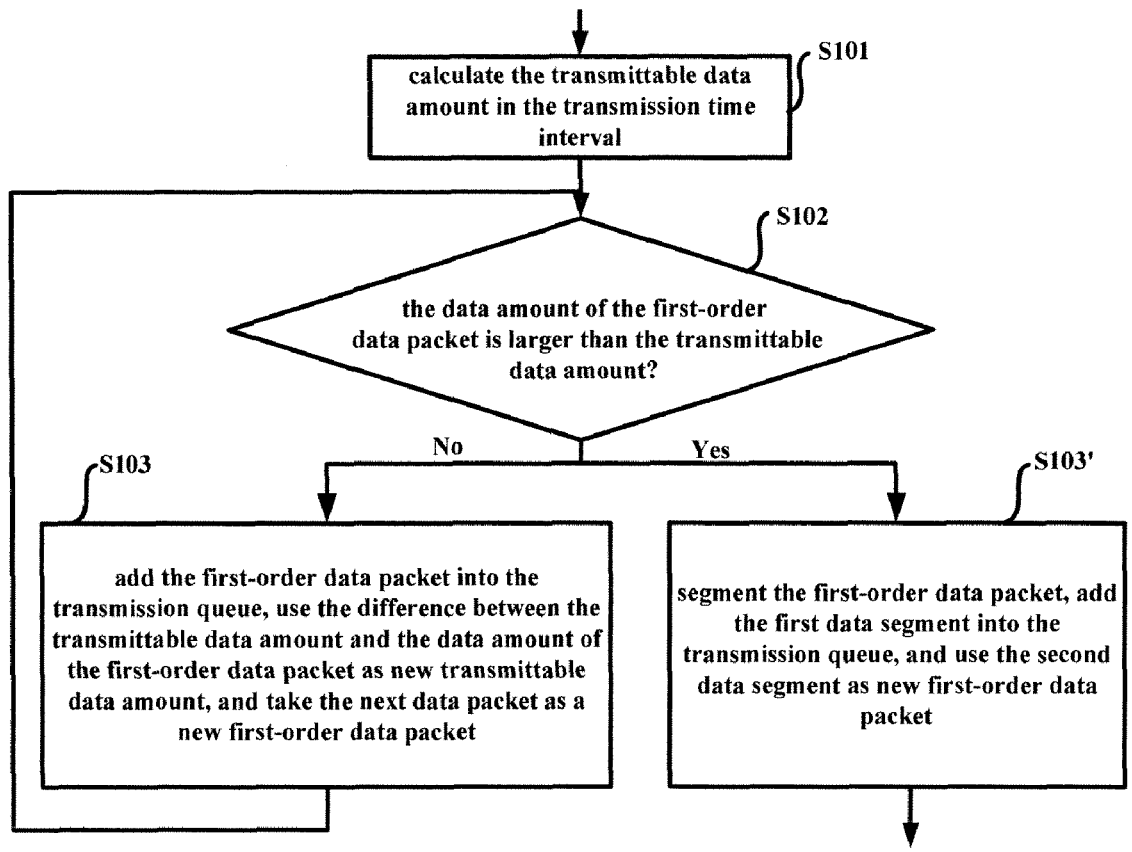
FIG. 3 is a specific flowchart of step S10 shown in FIG. 2.

The detailed procedure of step S10 will be described with reference to FIG. 3 and in conjunction with FIGS. 1 and 2. The step starts with sub-step S101 in which a transmittable data amount in the transmission time is calculated based on the TTI. For example, the calculation is conducted according to the following expression:

"data transmission rate*TTI=transmittable data amount."

After that, the procedure goes to step S102.

In step S102, it is judged whether the data amount of a first-order data packet (which might be an original data packet or a data segment) in the to-be-transmitted data packets is larger than said transmittable data amount. If the data amount of said first-order data packet is larger than said transmittable data amount, it means that the first-order data packet in the to-be-transmitted data packets cannot be transmitted totally in the current TTI. Thus, it is necessary to go to step S103 in order to make full use of the TTI.

In step S103, the first-order data packet is segmented into a first data segment that is added to the transmission queue and a second data segment that acts as a new first-order data packet, wherein the data amount of said first data segment is equal to the transmittable data amount. Since the TTI is too small, the queue of component data packet(s) that will be used for generating a transmitted data packet merely comprises said first data segment, and after segmentation, the first-order data packet in the to-be-transmitted data packets becomes said second data segment obtained from the segmentation which waits for the arrival of the next TTI.

If the data amount of said first-order data packet is smaller than or equal to said transmittable data amount, it means that at least the first-order data packet in the to-be-transmitted data packets can be transmitted in the current TTI. Thus, the procedure goes to step S103'.

In step S103', the first-order data packet is added to the transmission queue as a component data packet, and calculation is conducted according to the following expression:

"transmittable data amount−data amount of the first-order data packet=new transmittable data amount."

That is, the difference between the transmittable data amount and the data amount of the first-order data packet is used as the new transmittable data amount, and the next data packet to the first-order data packet acts as a new first-order data packet. Step S102 is repeated.

Thus, processing device 1 performs corresponding processing on the respective to-be-transmitted data packets until the TTI runs out, thereby obtaining a component data packet transmission queue comprising one or more component data packets for generating a transmission data packet. Then, the procedure goes to step S11.

In step S11, a sub-header is generated for each component data packet in the transmission queue in accordance with needs, which contains the following information of the component data packet:

original data packet ID for indicating the original data packet which the component data packet belongs to. Preferably, said original data packet ID is a sequence number that is capable of uniquely determining an original data packet;

segmentation processing ID for indicating times of segmentation happened to the original data packet in order to obtain said component data packet, and the data segment which said component data packet belongs to after each segmentation, wherein when an original data packet that has not been segmented appears in the transmission queue as a component data packet, its segmentation processing ID indicates no segmentation;

data amount ID for indicating the data amount of data portion of said component data packet, so that the receiver end will be clear about the starting point and the terminal point of data portion of a component data packet during parsing.

Subsequently, various situations of said component data packet are determined through a step that is not shown in FIG. 2. In this step, it is judged whether or not a to-be-transmitted data packet corresponding to the component data packet is the second data segment obtained from the last segmentation. Specifically, the solution based on the present invention will generate a sub-header for each of the two data segments generated from the segmentation. Thus, said judgment can be fulfilled by judging whether or not the to-be-transmitted data packet has such a sub-header.

Corresponding to the different situations of the component data packet, said segmentation processing ID has the following situations:

1. where the component data packet is an original data packet:

its segmentation processing ID merely comprises a segmentation processing time ID for indicating times of segmentation happened to the original data packet, which is indicated by the original data packet ID, in order to obtain the component data packet. Suppose the ID comprises 3 bits, then 000 indicates no segmentation, 001 indicates the first time segmentation, and the rest is reasoned out by analogy;

2. where the component data packet is a data segment:

its segmentation processing ID comprises a segmentation processing time ID for indicating times of segmentation happened to the original data packet, which is indicated by the original data packet ID, in order to obtain the component data packet. Suppose the ID comprises 3 bits, then 000 indicates no segmentation, 001 indicates the first time segmentation, and the rest is reasoned out by analogy; and data segment ID for indicating the data segment which this data segment belongs to after each segmentation during the process of obtaining this data segment by the original data packet. For example, when the first-order data packet is an original data packet, and the whole original data packet cannot be transmitted in the TTI since the TTI is relatively small, so this original data packet (to-be-transmitted data packet) needs to be segmented into a first data segment and a second data segment. Correspondingly, the segmentation processing time ID=001, and the data segment IDs in the sub-headers of the first data segment and the second data segment are 0 and 1 respectively (indicating whether the data segment is a first data segment or a second data segment after the segmentation).When the next TTI comes, if the data amount of the first-order data packet (the second data segment after the first segmentation) in the to-be-transmitted data packets is still larger than the transmittable data amount, a second segmentation is needed for said second data segment, which generates a new first data segment a and a new second data segment b. Correspondingly, the segmentation processing time ID=010, and the data segment IDs in the sub-headers of the new first data segment a and the new second data segment b are 10 and 11 respectively (take "10" as an example, wherein "1" indicates that after the first segmentation, said new first data segment a belongs to the second data segment, and "0" indicates that, after the second segmentation, i.e. the current segmentation, the data segment a belongs to the first data segment). And the situation of multiple times of segmentation is reasoned out by analogy.

So far, sub-headers have been generated for the respective component data packets used for constituting the transmitted data packet transmitted in the current TTI. The procedure goes to step S12:

In step S12, a transmitted data packet is generated based on each of said generated sub-headers and data portion of respective component data packets in said transmitted queue. The specific flow of step S12 will be described in conjunction with FIG. 4.

Figure 4:
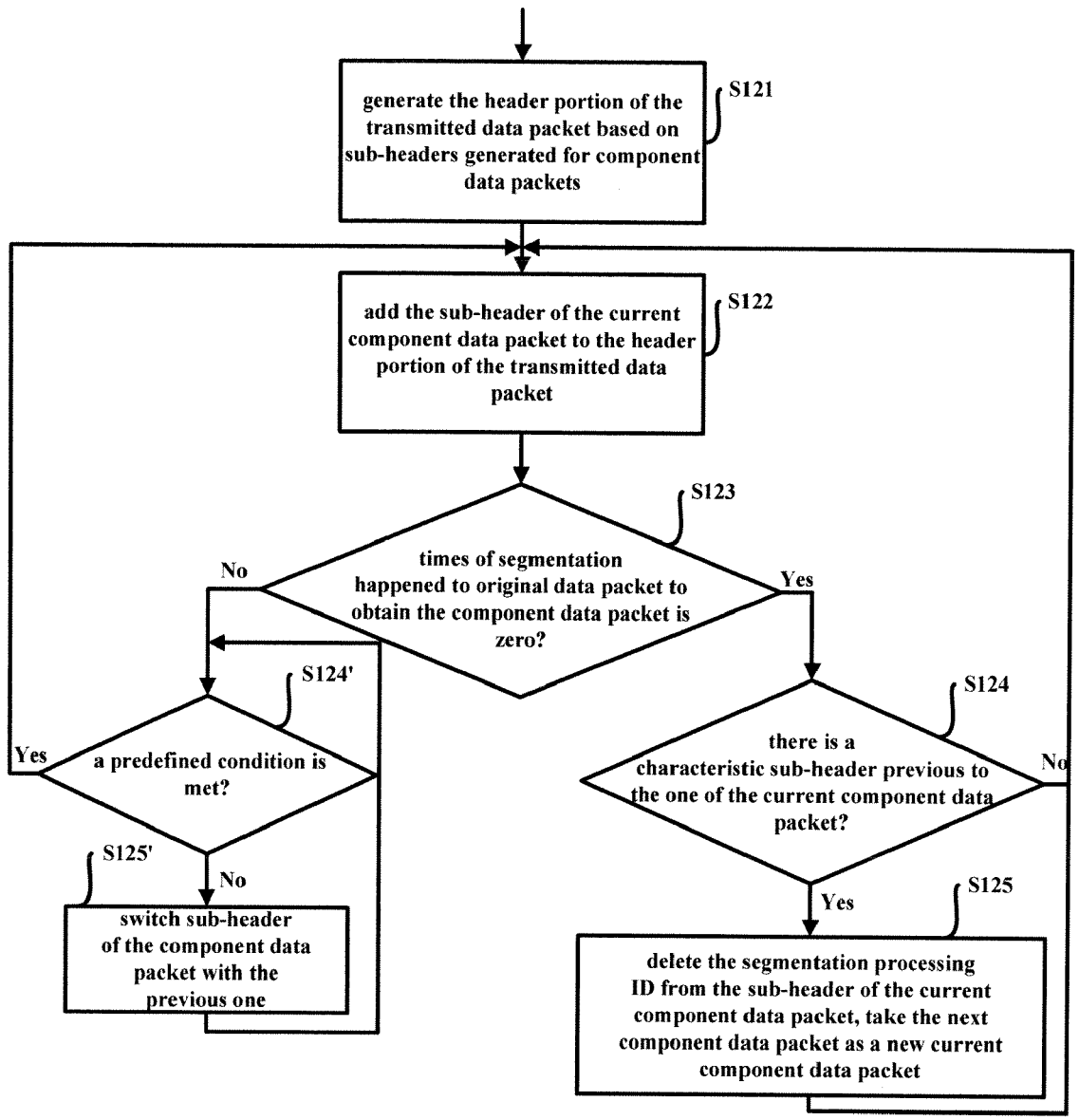
FIG. 4 is a specific flowchart of step S12 shown in FIG. 2.

FIG. 4 is a specific flowchart of step S12 shown in FIG. 2. Step S12 starts with sub-step S121:

In sub-step S121, based on the number of component data packets (or generated sub-headers) in said transmission queue, component number indicating information is determined for indicating the number of component data packets contained in said transmitted data packet and then is added to the header portion of the transmitted data packet. Then, the flow goes to step S122;

In sub-step S122, the sub-header that was previously generated for the current component data packet (i.e. the first-order component data packet) in the transmission queue (hereinafter, "the sub-header that was previously generated for the current component data packet" will be referred to as "the sub-header of the component data packet" for the conciseness reason) is added to the header portion of the transmitted data packet. Then, the flow goes to step sub-step S123:

In sub-step S123, it is judged, according to the segmentation processing ID contained in the sub-header of the component data packet, whether or not times of segmentation happened to the corresponding original data packet in order to obtain said component data packet is zero. Here, it is necessary to briefly illustrate the technical object of step S123 and subsequent steps. The present invention is aimed at reducing header overheads as much as possible. If the previously generated sub-headers are added to the header potion of the transmitted data packet in order simply and without any alteration, the present invention also has the advantage of less header overheads over the prior art, whereas such an advantage can be increased through step S123 and its subsequently steps. In short, the present invention selectively deletes those segmentation processing IDs, which indicate no segmentation, in respective sub-headers (preferably, the segmentation processing ID may merely comprise the segmentation processing time ID for the situation of no segmentation) so as to reduce the number of bits occupied by the header portion of the transmitted data packet, and releases them to the data portion.

After step S123, if the judgment result is that times of segmentation happened to the original data packet in order to obtain said component data packet is not zero, then the flow goes to step S124':

In step S124', it is judged whether or not a predefined condition is met. Said predefined condition is that in the header portion of the transmitted data packet, the segmentation processing ID contained in the previous sub-header to the sub-header of the current component data packet indicates that times of segmentation happened to the original data packet in order to obtain a component data packet corresponding to the previous sub-header is not zero, or indicates that the sub-header of the current component data packet is at the top of the header portion of the transmitted data packet;

If the judgment result of step S124' is that the predefined condition is met, then the next component data packet to the current data packet in the transmission queue acts as a new current component data packet, and steps S122 and S123 as well as subsequently operations are performed on the new current component data packet.

If the judgment result of step S124' is that the predefined condition is not met, then the flow goes to step S125'. In step S125', the sub-header of the current component data packet is switched with the previous sub-header to the sub-header of the current component data packet in the header portion of the transmitted data packet. Then, the flow returns to step S124 to continue to make judgment.

After step S123, if the judgment result is that there is no segmentation happened to the original data packet in order to obtain the component data packet, then the flow goes to step S124:

In step S124, it is judged whether or not there is a characteristic sub-header before the sub-header corresponding to the current component data packet in the header portion of said transmitted data packet. The segmentation processing ID contained in said characteristic sub-header indicates that there is no segmentation happened to the original data packet in order to obtain the component data packet corresponding to the characteristic sub-header. That is to say, in a transmission queue corresponding to one transmission time interval (TTI), since there might be multiple original data packets that act as component data packets and all segmentation processing IDs in the sub-headers generated for them indicate no segmentation, simply by moving headers of all component data packets, of which the segmentation processing ID indicates that the segmentation time is not zero, to the top of the header portion (like step S125') and with the help of the component number indicating information, the receiver end is aware of such a signal from the characteristic sub-header that "all component data packets corresponding to (N-M) sub-headers from here are original data packets and can be forwarded directly." Here, N is the component number indicating information, and M is the number of non-original data packets at the top of the transmitted data packet (the segmentation processing ID in its sub-header, specifically the segmentation processing time ID indicates the segmentation processing time is not zero).

If the judgment result of step S124 is that in the header portion of said transmitted data packet, there is a characteristic sub-header previous to the sub-header corresponding to the current component data packet (there is already said signal that assists the receiver end in correct parsing), then the flow goes to step S125 to delete the segmentation processing ID from the sub-header corresponding to said current component data packet and use the next component data packet to the current component data packet in the transmission queue as a new current component data packet. And steps S122 and S123 as well as subsequent operations are performed to the new current component data packet.

If the judgment of step S124 is that in the header portion of said transmitted data packet, there is no characteristic sub-header previous to the sub-header corresponding to the current component data packet (there is already said signal that assists the receiver end in correct parsing), then the next component data packet to the current component data packet in the transmission queue is used as a new current component data packet, and steps S122 and S123 as well as subsequent operations are performed to the new current component data packet.

Correspondingly, for each component data packet in the transmission queue, its data portion is added to the data portion of the transmitted data packet in the same position relationship as its sub-header in the header portion of the transmitted data packet, to finally generate a complete transmitted data packet.

Figure 5:
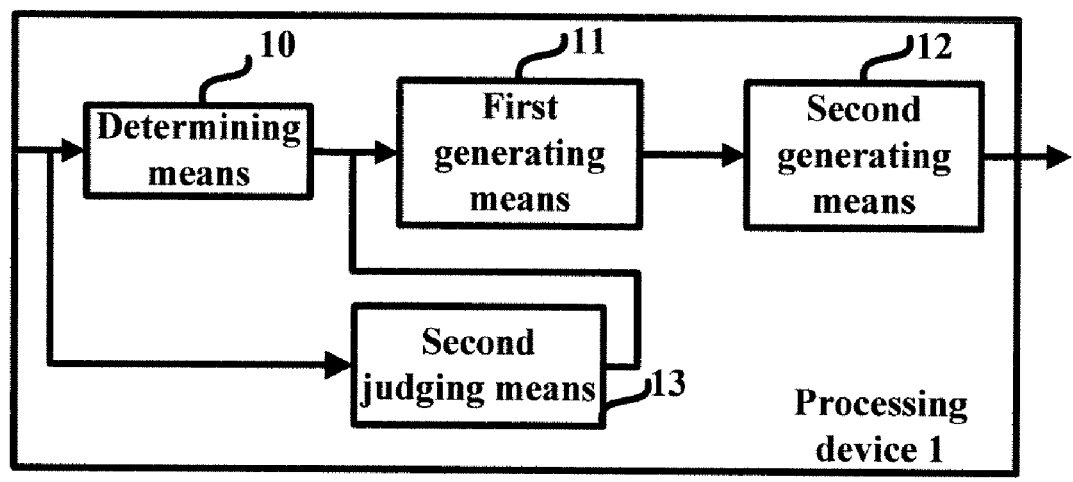
FIG. 5 is a block diagram of a processing device for processing a to-be-transmitted data packet based on transmission time in the sending device of the communication network according to an embodiment of the present invention.

FIG. 5 is a block diagram of a processing device for processing to-be-transmitted data packets based on transmission time interval in the sending device of the communication network according to an embodiment of the present invention. The method will be described with reference to FIG. 5 and in conjunction with FIG. 1. Processing device 1 comprises determining means 10, first generating means 11, second generating means 12 and second judging means 13. Preferably, determining means 10 comprises calculating means 101, first judging means 103, segmenting means 103 and first controlling means 104; second generating means 12 comprises component number determining means 120, adding means 121, third judging means 122, second controlling means 123, switching means 124 and deleting means 125. Take downlink transmission as an example.

Determining means 10 determines a transmission queue of component data packet(s) corresponding to the transmission time interval, i.e. a transmission queue of component data packet(s) to be transmitted in the TTI. According to the TTI, processing device 1 in sending device a of base station I determines from to-be-transmitted data packets (the following description will not distinguish between retransmission queue and conventional transmission queue for the purpose of conciseness) component data packet(s) that can be transmitted in said TTI. According to the size relationship between the transmittable data amount corresponding to the TTI and the original data packet or the data segment, the queue of determined component data packet(s) to be transmitted in the TTI may comprise the following circumstances:

where the queue comprises only one component data packet that is a data segment or an original data packet;
  the first component data packet in the queue is a data segment or an original data packet, which is followed by zero to multiple original data packets, and the end of the queue is zero or one data segment.

Figure 6:
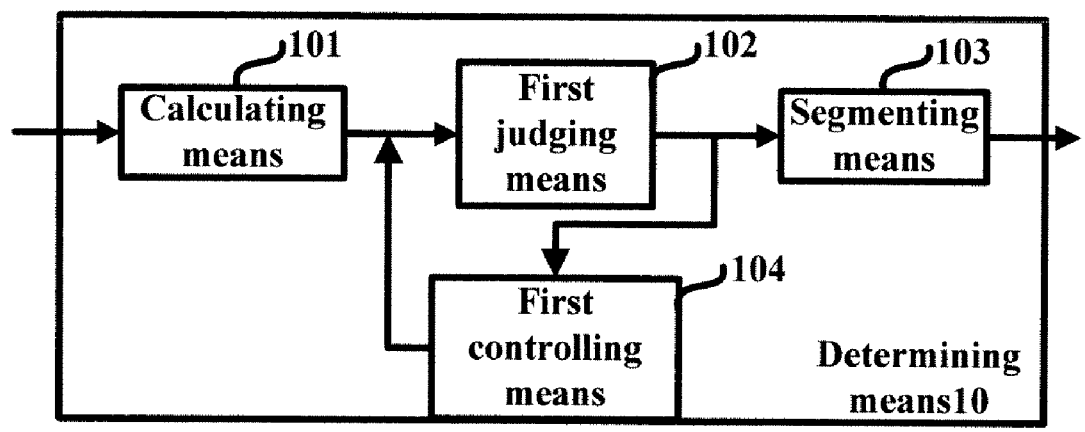
FIG. 6 is a specific block diagram of determining means 5 shown in FIG. 5.

The detailed block layout diagram of determining means 10 will be described with reference to FIG. 6 and in conjunction with FIGS. 1 and 5. Calculating means 101 calculates a transmittable data amount in the transmission time interval based on the TTI. For example, the calculation is conducted according to the following expression:

"data transmission rate*TTI=transmittable data amount."
After that, the calculation result is provided to first judging means 102.

First judging means 102 judges whether the data amount of a first-order data packet (which might be an original data packet or a data segment) in the to-be-transmitted data packets is larger than said transmittable data amount. If the data amount of said first-order data packet is larger than said transmittable data amount, it means that the first-order data packet in the to-be-transmitted data packets cannot be transmitted totally in the current TTI.

For the situation in which the data amount of the first-order data packet is larger than the transmittable data amount, segmenting means 103 segments the first-order data packet into a first data segment that is added to the transmission queue and a second data segment that acts as a new first-order data packet, wherein the data amount of said first data segment is equal to the transmittable data amount. Since the TTI is too small, the queue of component data packet(s) that will be used for generating a transmitted data packet merely comprises said first data segment, and after segmentation, the first-order data packet in the to-be-transmitted data packets becomes said second data segment obtained from the segmentation which waits for the arrival of the next TTI.

If the data amount of said first-order data packet is smaller than or equal to said transmittable data amount, it means that at least the first-order data packet in the to-be-transmitted data packets can be transmitted in the current TTI. Thus, the first controlling means 104 adds the first-order data packet to the transmission queue as a component data packet and conducts calculation according to the following expression (said first controlling means 104 comprises a calculation means which, however, is not shown in the figure for conciseness reason):

"transmittable data amount−data amount of the first-order data packet=new transmittable data amount."

That is, the difference between the transmittable data amount and the data amount of the first-order data packet is used as the new transmittable data amount, and the next data packet to the first-order data packet acts as a new first-order data packet, then, the first controlling means 104 controls the first judging means 102 to judge whether or not the data amount of the new first-order data packet is larger than the new transmittable data amount.

Thus, processing device 1 performs corresponding processing on the respective to-be-transmitted data packets until the TTI runs out, thereby obtains a component data packet transmission queue comprising one or more component data packets for generating a transmitted data packet.

The First generating means 11 generates a sub-header for each component data packet in the transmission queue in accordance with needs, which contains the following information of the component data packet:

original data packet ID for indicating the original data packet which the component data packet belongs to. Preferably, said original data packet ID is a sequence number that is capable of uniquely determining an original data packet;

segmentation processing ID for indicating times of segmentation happened to the original data packet in order to obtain the component data packet, and the data segment which said component data packet belongs to after each segmentation, wherein when an original data packet that has not been segmented appears in the transmission queue as a component data packet, its segmentation processing ID indicates no segmentation;

data amount ID for indicating the data amount of data portion of the component data packet, so that the receiver end will be clear about the starting point and the terminal point of data portion of the component data packet during parsing.

Subsequently, various situations of said component data packet are determined by a judging means that is not shown in FIG. 5. The judging means judges whether or not the to-be-transmitted data packet corresponding to the component data packet is the second data segment obtained from the last segmentation. Specifically, the solution based on the present invention will generate a sub-header for each of the two data segments generated from a segmentation. Thus, said judgment can be fulfilled by judging whether or not the to-be-transmitted data packet has such a sub-header.

Corresponding to the different situations of the component data packet, said segmentation processing ID has the following situations:

1. where the component data packet is an original data packet:

its segmentation processing ID merely comprises a segmentation processing time ID for indicating times of segmentation happened to the original data packet, which is indicated by the original data packet ID, in order to obtain the component data packet. Suppose the ID comprises 3 bits, then 000 indicates no segmentation, 001 indicates the first time segmentation, and the rest is reasoned out by analogy;

2. where the component data packet is a data segment:

its segmentation processing ID comprises a segmentation processing time ID for indicating times of segmentation happened to the original data packet, which is indicated by the original data packet ID, in order to obtain the component data packet. Suppose the ID comprises 3 bits, then 000 indicates no segmentation, 001 indicates the first time segmentation, and the rest is reasoned out by analogy; and data segment ID for indicating the data segment which the data segment belongs to after each segmentation during the process of obtaining the data segment by the original data packet. For example, when the first-order data packet is an original data packet, and the whole original data packet cannot be transmitted in the TTI since the TTI is relatively small, so this original data packet (a to-be-transmitted data packet) needs to be segmented into a first data segment and a second data segment. Correspondingly, the segmentation processing time ID=001, and the data segment IDs in the sub-headers of the first data segment and the second data segment are 0 and 1 respectively (indicating whether the data segment is a first data segment or a second data segment after the segmentation). After the next TTI comes, if the data amount of the first-order data packet (the second data segment after the first segmentation) in the to-be-transmitted data packets is still larger than the transmittable data amount, a second segmentation is needed for said second data segment, which generates a new first data segment a and a new second data segment b. Correspondingly, the segmentation processing time ID=010, and the data segment IDs in the sub-headers of the new first data segment a and the new second data segment b are 10 and 11 respectively (take "10" as an example, wherein "1" indicates that after the first segmentation, said new first data segment a belongs to the second data segment, and "0" indicates that, after the second segmentation, i.e. the current segmentation, the data segment a is the first data segment). And the situation of multiple times of segmentation is reasoned out by analogy.

So far, first generating means 11 has generated sub-headers for the respective component data packets used for constituting the transmitted data packet which will be transmitted in the current TTI.

Second generating means 12 generates a transmitted data packet based on each of said sub-headers generated by first generating means 11 and data portion of respective component data packets in said transmitted queue. Second generating means 12 will be described in detail with reference to FIG. 7 and in conjunction with FIG. 5.

Figure 7:
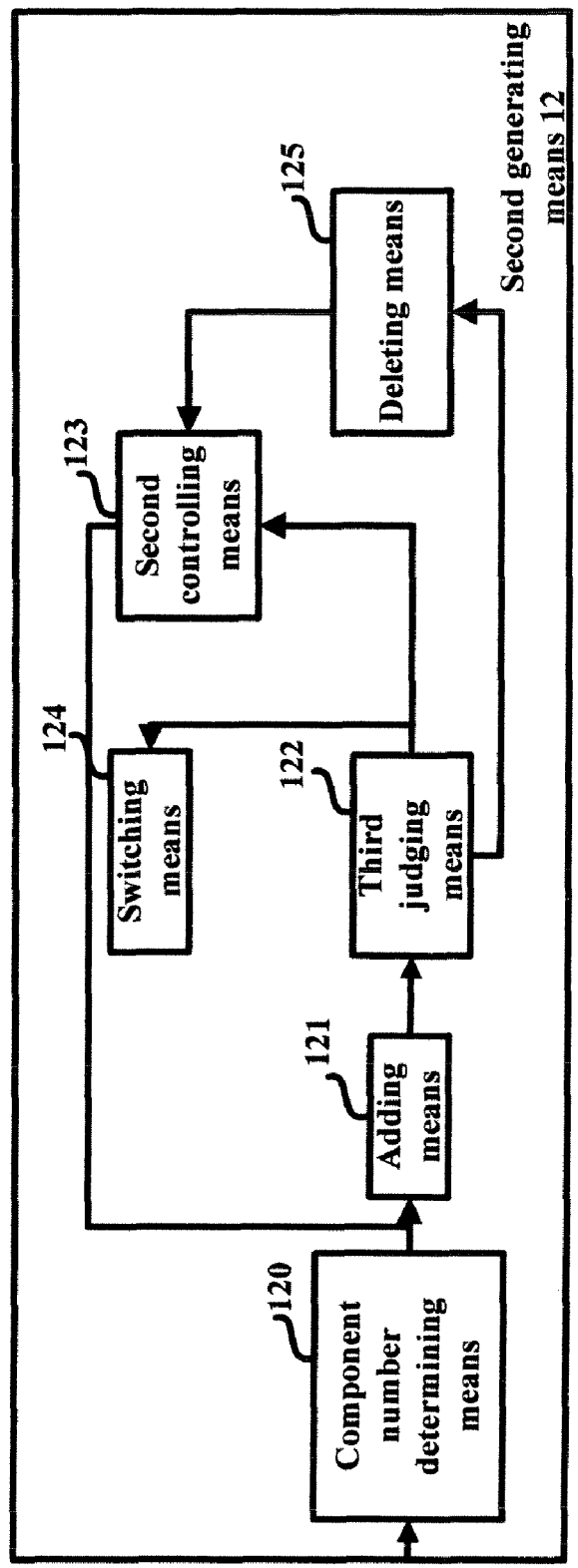
FIG. 7 is a specific block diagram of second generating means 12 shown in FIG. 5.

FIG. 7 is a specific block diagram of second generating means 12 shown in FIG. 5.

Based on the number of component data packets (or generated sub-headers) in said transmission queue, component number determining means 121 determines component number indicating information for indicating the number of component data packets contained in said transmitted data packet and adds it to the header portion of the transmitted data packet.

Adding means 121 adds the sub-header that was previously generated for the current component data packet (i.e. the first-order component data packet) in the transmission queue (hereinafter, "the sub-header that was previously generated for the current component data packet" will be referred to as "the sub-header of the component data packet" for the conciseness reason) to the header portion of the transmitted data packet.

According to the segmentation processing ID contained in the sub-header of the component data packet, a third judging means 122 judges whether or not times of segmentation happened to the corresponding original data packet in order to obtain this component data packet is zero. Here, it is necessary to briefly illustrate the technical object of the present invention. The present invention is aimed at reducing header overheads as much as possible. If the previously generated sub-headers are added to the header potion of the transmitted data packet in order without any alteration, the present invention also has the advantage of less header overheads over the prior art, whereas such an advantage can be further increased. In short, the present invention selectively deletes those segmentation processing IDs, which indicate no segmentation, in respective sub-headers (preferably, the segmentation processing ID may merely comprise the segmentation processing time ID for the situation of no segmentation) so as to reduce the number of bits occupied by the header portion of the transmitted data packet, and release them to the data portion.

If the judgment result is that times of segmentation happened to the original data packet in order to obtain the component data packet is not zero, then the third judging means 122 judges whether or not a predefined condition is met. Said predefined condition is that in the header portion of the transmitted data packet, the segmentation processing ID contained in the previous sub-header to the sub-header of the current component data packet indicates that times of segmentation happened to the original data packet in order to obtain the component data packet corresponding to the previous sub-header is not zero, or indicates that the sub-header of the current component data packet is already at the top of the header portion of the transmitted data packet;

If the predefined condition is met, then second controlling means 123 uses the next component data packet to the current data packet in the transmission queue as a new current component data packet and controls adding means 121 and third judging means 122 to perform corresponding operations on said new current component data packet.

If the judgment result is that the predefined condition is not met, then switching means 124 switches the sub-header of the current component data packet with the previous sub-header to the sub-header of the current component data packet in the header portion of the transmitted data packet. Then, the third judging means 122 continues to judge whether or not the predefined condition is met.

If the judgment result is that there is no segmentation happened to the original data packet in order to obtain the component data packet, then the third judging means 122 judges whether or not there is a characteristic sub-header before the sub-header corresponding to the current component data packet in the header portion of said transmitted data packet. The segmentation processing ID contained in said characteristic sub-header indicates that there is no segmentation happened to the original data packet in order to obtain the component data packet corresponding to the characteristic sub-header. That is to say, in a transmission queue corresponding to one TTI, since there might be multiple original data packets that act as component data packets and all segmentation processing IDs generated for them in the sub-headers indicate no segmentation, simply by moving headers of all component data packets, of which the segmentation processing ID indicates no segmentation, to the top of the header portion (like step S125') and with the help of the component number indicating information, the receiver end is aware of such a signal from the characteristic sub-header that "all component data packets corresponding to (N-M) sub-headers from here are original data packets and can be forwarded directly." Wherein, N is the component number indicating information, and M is the number of the non-original data packet(s) at the top of the transmitted data packet (the segmentation processing ID in its sub-header, specifically the segmentation processing time ID indicates the segmentation processing time is not zero).

If the judgment result is that in the header portion of said transmitted data packet, there is a characteristic sub-header previous to the sub-header corresponding to the current component data packet (there is already said signal that assists the receiver end in correct parsing), then deleting means 125 deletes the segmentation processing ID from the sub-header corresponding to said current component data packet, and second controlling means 123 uses the next component data packet to the current component data packet in the transmission queue as a new current component data packet, and then the controls adding means 121 and the third judging means 122 to perform corresponding operations on the new current component data packet.

If the judgment result is that in the header portion of said transmitted data packet, there is no characteristic sub-header previous to the sub-header corresponding to the current component data packet (there is already said signal that assists the receiver end in correct parsing), then second controlling means 123 uses the next component data packet to the current component data packet in the transmission queue as a new current component data packet to control adding means 121 and third judging means 122 to perform corresponding subsequent operations on it.

Correspondingly, for each component data packet in the transmission queue, adding means 121 adds its data portion to the data portion of the transmitted data packet in the same position relationship as its sub-header in the header portion of the transmitted data packet, to finally generate a complete transmitted data packet.

FIG. 8 is a flowchart of a method of parsing a transmitted data packet based on transmission time interval in a receiving device of the communication network according to an embodiment of the present invention. The method starts with step S21 in which component number indicating information is extracted from the header portion of the transmitted data packet. Only according to said component number indicating information, will the receiver end correctly perform subsequent processing on the received transmitted data packet, otherwise the receiver end cannot know when to finish parsing the transmitted data packet (i.e. whether or not the parsing process has reached the terminal point of the transmitted data packet). Then, the flow goes to step S22.

In step S22, a first-order sub-header is extracted from the header portion of said transmitted data packet. Then, the flow goes to step S23.

In step S23, according to segmentation processing information contained in the first-order sub-header, it is judged whether or not times of segmentation happened to the original data packet in order to obtain the component data packet corresponding to said first-order sub-header is zero. According to the optimized data packet structure defining manner, in a transmitted data packet, all component data packets following a component data packet for which a first "segmentation processing ID" indicates no segmentation are all complete original data packets.

When times of segmentation happened to the component data packet corresponding to the first-order sub-header is not zero, in step S24, the data portion corresponding to it is extracted from the data portion of the transmitted data packet and stored into a buffer to be combined with subsequent corresponding component data packet(s) to restore the original data packet.

Then, the next sub-header to the first-order sub-header in the header portion of the transmitted data packet is used as a new first-order sub-header in step S25. And steps S22 and S23 are repeated.

When times of segmentation happened to the original data packet in order to obtain said component data packet corresponding to the first-order sub-header is zero, in step S24', the data portion of each component data packet following the data portion of said component data packet is extracted to be sent.

After the receiver end parses sub-headers according to the extracted component number indicating information, it extracts the corresponding data portion according to the data amount ID in each sub-header. The processing on the transmitted data packet ends with parsing N (N is a decimal value corresponding to the component number indicating information) sub-headers and extracting N data portions.

FIG. 9 is a block diagram of a parsing device of parsing a transmitted data packet based on transmission time interval in the receiving device of the communication network according to an embodiment of the present invention, comprising a extracting means 21, a judging means 22, a parsing device 23 and a controlling means 24.

Said extracting means 21 extracts component number indicating information from the header portion of the transmitted data packet. Only according to said component number indicating information, will the receiver end correctly perform subsequent processing on the received transmitted data packet, otherwise the receiver end cannot know when to finish parsing the transmitted data packet (i.e. whether or not the parsing process has reached the terminal point of the transmitted data packet).

Subsequently, extracting means 21 extracts a first-order sub-header from the header portion of said transmitted data packet.

According to segmentation processing information contained in the first-order sub-header, judging means 22 judges whether or not times of segmentation happened to the original data packet in order to obtain the component data packet corresponding to the first-order sub-header is zero. According to the optimized data packet structure defining manner, in a transmitted data packet, all component data packets following the component data packet for which a first "segmentation processing ID" indicates no segmentation are all complete original data packets.

When times of segmentation happened to original data packet to obtain the component data packet corresponding to the first-order sub-header is not zero, extracting means 21 extracts the corresponding data portion from the data portion of the transmitted data packet and stores it into a buffer.

Then, said controlling means 23 uses the next sub-header to the first-order sub-header in the header portion of the transmitted data packet as a new first-order sub-header and controls the respective means mentioned above to perform corresponding operations on the new first-order sub-header.

When times of segmentation happened to the original data packet in order to obtain said component data packet corresponding to the first-order sub-header is zero, the extracting means 21 extracts a corresponding data portion from the data portion of the component data packet.

After the receiver end parses sub-headers according to the extracted component number indicating information, it extracts a corresponding data portion according to a data amount ID in each sub-header. The processing on the transmitted data packet ends with parsing N (N is a decimal value corresponding to the component number indicating information) sub-headers and extracting N data portions.

As the embodiments of the present invention have been described, it is to be understood that the present invention is not limited to the above specific embodiments. Various modifications or alternations may be made by those skilled in the art within the scope as defined in the appended claims.

What is claimed is:

1. A method of processing to-be-transmitted data packets based on a transmission time interval in a sending device of a wireless communication network, the method comprising:

according to said transmission time interval, determining a transmission queue of component data packets corresponding to the transmission time interval based on a to-be-transmitted data packet;

generating a sub-header for each component data packet in said transmission queue in accordance with the following information in the component data packet:

an original data packet ID that indicates the original data packet which the component data packet belongs to;

a segmentation processing ID comprising the number of times that segmentation has occurred with respect to said original data packet in order to obtain said component data packet, and the data segment which said component data packet belongs to after each segmentation;

a data amount ID that indicates the data amount of the data portion of said component data packet;

generating a transmitted data packet based on each of said generated sub-headers and data portions of the respective component data packets in said transmission queue, whose header portion contains at least one component number indicating information for indicating the number of component data packets contained in said transmitted data packet.

2. The method according to claim 1, wherein determining a transmission queue of data packets further comprises:
according to said transmission time interval, calculating a transmittable data amount in said transmission time interval;
judging whether or not the data amount of the first-order data packet in the to-be-transmitted data packets is larger than said transmittable data amount;
if the data amount of said first-order data packet is larger than said transmittable data amount, segmenting the first-order data packet into a first data segment and a second data segment, adding said first data segment into the transmission queue and using said second data segment as a new first-order data packet, wherein the data amount of said first data segment is equal to the transmittable data amount.

3. The method according to claim 2, wherein generating a sub-header for each component data packet further comprises:
generating sub-headers for said first data segment and said second data segment respectively, each of the generated sub-headers comprising:
an original data packet ID that indicates an original data packet which the data segment belongs to;
a segmentation processing ID that indicates the number of times of segmentation has occurred with respect to the original data packet in order to obtain the data segment, and the data segment which said data segment belongs to after each segmentation;
a data amount that indicates information for indicating the data amount of the data portion of said data segment;
wherein said segmentation processing ID further comprises:
a segmentation processing time ID that indicates the number of times of segmentation has occurred with respect to the original data packet in order to obtain said data segment;
a data segment ID that indicates the data segment which said data segment belongs to after each segmentation during the process of obtaining said data segment by the original data packet.

4. The method according to claim 2, wherein determining transmission queue of component data packets further comprises:
if the data amount of said first-order data packet is less than or equal to said transmittable data amount, adding said first-order data packet into the transmission queue as a component data packet, using the difference between said transmittable data amount and the data amount of said first-order data packet as a new transmittable data amount, taking the next data packet to said first-order data packet as a new first-order data packet, and judging whether or not the data amount of the first-order data packet in the to-be-transmitted data packets is larger than said transmittable data amount.

5. The method according to claim 3, wherein generating a sub-header for each component data packet in said transmission queue further comprises:
judging whether or not the to-be-transmitted data packet corresponding to the component data packet is the second data segment obtained from the previous segmentation processing;
if said to-be-transmitted data packet is the second data segment obtained from the previous segmentation, generating a sub-header for the component data packet based on the previously generated sub-header for said to-be-transmitted data packet;
if said to-be-transmitted data packet is the second data segment obtained from the previous segmentation, then generating sub-headers for said first data segment and said second data segment obtained from the current segmentation based on the previously generated sub-header for said to-be-transmitted data packet.

6. The method according to claim 1, wherein generating a transmitted data packet further comprises:
generating a header portion of said transmitted data packet based on sub-headers generated for respective component data packets in said transmission queue, said header portion comprising at least one component number that includes information indicating the number of component data packets contained in said transmitted data packet.

7. The method according to claim 1, wherein generating a transmitted data packet further comprises:
adding the sub-header of the current component data packet in the transmission queue into the header portion of the transmitted data packet;
according to the segmentation processing ID contained in the sub-header of the component data packet, judging whether or not the number of times that segmentation has occurred with respect to the corresponding original data packet in order to obtain said component data packet is zero;
if the number of times that segmentation has occurred with respect to said corresponding original data packet in order to obtain said component data packet is not zero, judging whether or not a predefined condition is met;
if the predefined condition is met, taking the next component data packet to the current component data packet in the transmission queue as a new current component data packet;
adding the data portion of each component data packet to the data portion of the transmitted data packet in the same position relationship as the sub-header of said each component data packet in said transmission queue in the header portion of the transmitted data packet.

8. The method according to claim 7, further comprising:
if the predefined condition is not met, switching the sub-header of said current component data packet with the previous sub-header to the sub-header of said current component data packet in the header portion of the transmitted data packet, and judging whether or not a predefined condition is met.

9. The method according to claim 7, further comprising:
if the number of times that segmentation has occurred with respect to the original data packet in order to obtain said component data packet is zero, judging whether or not in the header portion of said transmitted data packet there is a characteristic sub-header previous to the sub-header corresponding to said current component data packet, the segmentation processing ID contained in said characteristic sub-header indicating that no segmentation has occurred with respect to an original data packet in order to obtain the component data packet corresponding to the characteristic sub-header;
if there is said characteristic sub-header, deleting the segmentation processing ID thereof from the sub-header corresponding to said current component data packet, taking the next component data packet to said current component data packet in the transmission queue as a new current component data packet;

if there is no said characteristic sub-header, taking the next component data packet to said current component data packet in the transmission queue as a new current component data packet.

10. The method according to claim 7, wherein said predefined condition is that in the header portion of the transmitted data packet, the segmentation processing ID contained in the previous sub-header to the sub-header of said current component data packet indicates that the number of times that segmentation has occurred with respect to an original data packet in order to obtain the component data packet corresponding to the previous sub-header is not zero, or indicates that the sub-header of said current component data packet is already at the top of the header portion of the transmitted data packet.

11. The method according to claim 1, wherein said component data packet and said to-be-transmitted data packet each comprise an original data packet and/or data segments obtained from segmenting an original data packet or data segment.

12. A processing device for processing to-be-transmitted data packets based on transmission time interval in a sending device of a wireless communication network, the device comprising:
a determination component, according to said transmission time interval, that is operative to determine a transmission queue of component data packets corresponding to the transmission time interval based on a to-be-transmitted data packet;
a first generator that is operative to generate a sub-header for each component data packet in said transmission queue in accordance with needs, which comprises the following information of the component data packet:
an original data packet ID for indicating the original data packet which the component data packet belongs to;
a segmentation processing ID that indicates the number of times that segmentation has occurred with respect to said original data packet in order to obtain said component data packet, and the data segment which said component data packet belongs to after each segmentation;
a data amount ID that indicates the data amount of the data portion of said component data packet;
a second generator that is operative to generate a transmitted data packet based on each of said generated sub-headers and data portions of the respective component data packets in said transmission queue, whose header portion contains at least one component number indicating information for indicating the number of component data packets contained in said transmitted data packet.

13. The processing device according to claim 12, wherein said determination component further comprises:
a calculator that is operative to calculate a transmittable data amount in the transmission time according to said transmission time interval;
a first judging component that is operative to judge whether or not the data amount of the first-order data packet in the to-be-transmitted data packets is larger than said transmittable data amount;
a segmentation component that is operative to, if the data amount of said first-order data packet is larger than said transmittable data amount, segment the first-order data packet into a first data segment and a second data segment, add said first data segment into the transmission queue and using said second data segment as a new first-order data packet, wherein the data amount of said first data segment is equal to the transmittable data amount.

14. The processing device according to claim 13, wherein said first generator is further operative to generate sub-headers for said first data segment and said second data segment respectively, each of the generated sub-headers comprising:
an original data packet ID that indicates an original data packet which the data segment belongs to;
a segmentation processing ID that indicates that number of times that segmentation has occurred with respect to the original data packet in order to obtain the data segment and the data segment which said data segment belongs to after each segmentation;
a data amount that includes information that indicates the data amount of the data portion of said data segment;
wherein said segmentation processing ID further comprises:
a segmentation processing time ID for indicating the number of times that segmentation has occurred with respect to the original data packet in order to obtain said data segment;
a data segment ID that indicates the data segment which said data segment belongs to after each segmentation during the process of obtaining the data segment by the original data packet.

15. The processing device according to claim 13, wherein said determining means further comprises:
a first controller that is operative to, if the data amount of said first-order data packet is less than or equal to said transmittable data amount, add said first-order data packet into the transmission queue as a component data packet, use the difference between the transmittable data amount and the data amount of said first-order data packet as a new transmittable data amount, take the next data packet to said first-order data packet as a new first-order data packet, and control said judging component to perform operations on the new first-order data packet.

16. The processing device according to claim 15, further comprising:
a second judging component that is operative to judge whether or not the to-be-transmitted data packet corresponding to the component data packet is the second data segment obtained from the previous segmentation processing,
wherein said first generator is further operative to, if said to-be-transmitted data packet is the second data segment obtained from the previous segmentation, generate a sub-header for the component data packet based on the previously generated sub-header for said to-be-transmitted data packet;
and if said to-be-transmitted is the second data segment obtained from the previous segmentation, then generate sub-headers for the first data segment and the second data segment obtained from the current segmentation based on the previously generated sub-headers for said to-be-transmitted data packet.

17. The processing device according to claim 12, wherein said second generator further comprises:
a component number generator that is operative to generate a header portion of said transmitted data packet based on sub-headers generated for respective component data packets in said transmission queue, said header portion comprising at least one component number that includes information indicating the number of component data packets contained in said transmitted data packet.

18. The processing device according to claim 12, wherein said second generator further comprises:

an adding component that is operative to add the sub-header of the current component data packet in the transmission queue to the header portion of the transmitted data packet;
a third judging component that is operative to, according to the segmentation processing ID contained in the sub-header of the component data packet, judge whether or not the number of times that segmentation has occurred with respect to a corresponding original data packet in order to obtain the component data packet is zero;
wherein said third judging component is further operative to, if the number of times that segmentation has occurred with respect to said corresponding original data packet in order to obtain said component data packet is not zero, judge whether or not a predefined condition is met;
a second controller that is operative to, if the predefined condition is met, take the next component data packet to the current component data packet in the transmission queue as a new current component data packet;
wherein said adding component is operative to add the data portion of each component data packet to the data portion of the transmitted data packet in the same position relationship as the sub-header of said each component data packet in said transmission queue in the header portion of the transmitted data packet.

19. The processing device according to claim 18, wherein said second generator further comprises:
a switch that is operative to, if the predefined condition is not met, switch the sub-header of said current component data packet with the previous sub-header to the sub-header of said current component data packet in the header portion of the transmitted data packet;
and the third judging component is further operative to, after said switching, judge whether or not the predefined condition is met.

20. The processing device according to claim 18, wherein said third judging component is further operative to, if times of segmentation happened to the original data packet in order to obtain said component data packet is zero, judge whether or not in the header portion of said transmitted data packet, there is a characteristic sub-header previous to the sub-header corresponding to the current component data packet, a segmentation processing ID contained in said characteristic sub-header indicating no segmentation occurred with respect to an original data packet in order to obtain the component data packet corresponding to the characteristic sub-header;
said second generator further comprises a deleting component operative to, if there is said characteristic sub-header, deleting the segmentation processing ID thereof from a sub-header corresponding to said current component data packet;
wherein said second controller is further operative to, if there is no said characteristic sub-header, take the next component data packet to the current component data packet in the transmission queue as a new current component data packet, and control said adding component and said third judging component to perform corresponding operations on the new current component data packet; and after deleting the segmentation processing ID thereof from the sub-header corresponding to said current component data packet, take the next component data packet to the current component data packet in the transmission queue as a new current component data packet, and control said adding component and said third judging component to perform corresponding operations on the new current component data packet.

21. The processing device according to claim 18, wherein said predefined condition is that in the header portion of the transmitted data packet the segmentation processing ID contained in the previous sub-header to the sub-header of said current component data packet indicates the number of times that segmentation has occurred with respect to an original data packet in order to obtain the component data packet corresponding to the previous sub-header is not zero, or indicates that the sub-header of said current component data packet is already at the top of the header portion of the transmitted data packet.

22. The processing device according to claim 12, wherein said component data packet and said to-be-transmitted data packet each comprise an original data packet and/or data segments obtained from segmenting an original data packet or data segment.

23. A method of parsing a transmitted data packet based on a transmission time interval in a receiving device of a wireless communication network, the method comprising:
extracting at least one component number indicating information from the header portion of said transmitted data packet;
extracting the first-order sub-header from the header portion of said transmitted data packet;
according to segmentation processing information contained in said first-order sub-header, judging whether or not the number of times that segmentation has occurred with respect to an original data packet in order to obtain the component data packet corresponding to said first-order sub-header is zero;
if the number of times that segmentation has occurred with respect to the original data packet in order to obtain the component data packet corresponding to said first-order sub-header is not zero, extracting the corresponding data portion from the data portion of said transmitted data packet and storing it to a buffer;
using the next sub-header to said first-order sub-header in the header portion of said transmitted data packet as a new first-order sub-header, and extracting the first-order sub-header from the header portion of said transmitted data packet according to segmentation processing information contained in said first-order sub-header, judging whether or not the number of times that segmentation has occurred with respect to an original data packet in order to obtain the component data packet corresponding to said first-order sub-header is zero.

24. The method according to claim 23, further comprising:
if the number of times of segmentation that has occurred with respect to the original data packet in order to obtain the corresponding component data packet is zero, extracting data portions of respective component data packets following to the data portion of said component data packet in the transmitted data packet according to the component number indicating information of said transmitted data packet, for sending.

25. A parsing device for parsing a received transmitted data packet based on transmission time interval in a receiving device of a wireless communication network, the parsing device comprising:
an extractor that is operative to extract a component number indicating information from the header portion of said transmitted data packet,
wherein said extractor is further operative to extract the first-order sub-header from the header portion of said transmitted data packet;

a judging component that is operative to, according to the segmentation processing information contained in said first-order sub-header, judge whether or not the number of times that segmentation has occurred with respect to the original data packet in order to obtain the component data packet corresponding to said first-order sub-header is zero, wherein said extractor is further operative to extract the corresponding data portion from the data portion of said transmitted data packet and store it into a buffer if the number of times that segmentation has occurred with respect to the original data packet in order to obtain the component data packet corresponding to said first-order sub-header is not zero;

a controller that is operative to control the next sub-header to the first-order sub-header in the header portion of said transmitted data packet as a new first-order sub-header to control said extractor and said judging component to perform corresponding operations on the new first-order sub-header.

26. The parsing device according to claim 25, wherein said extractor is further operative to, if the number of times that segmentation has occurred with respect to the original data packet in order to obtain the corresponding component data packet is zero, extract data portions of respective component data packets following to the data portion of said component data packet in the transmitted data packet according to the component number indicating information of said transmitted data packet, for sending.

27. A processing device according to claim 12 implemented in a sending device in a wireless communication network.

28. A parsing device according to claim 25 implemented in a receiving device in a wireless communication network.

29. A processing device according to claim 12 implemented in a communication device in a wireless communication network as a part of a sending device, the communication device further comprising a receiving device.

* * * * *